Jan. 26, 1937.   L. E. LA`BRIE   2,068,956
BRAKE
Filed March 18, 1932   2 Sheets-Sheet 2
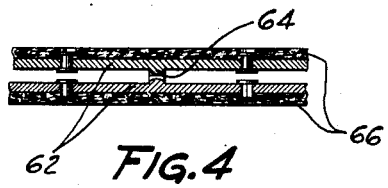
FIG.4
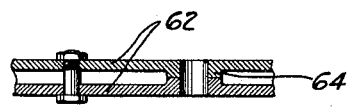
FIG.5
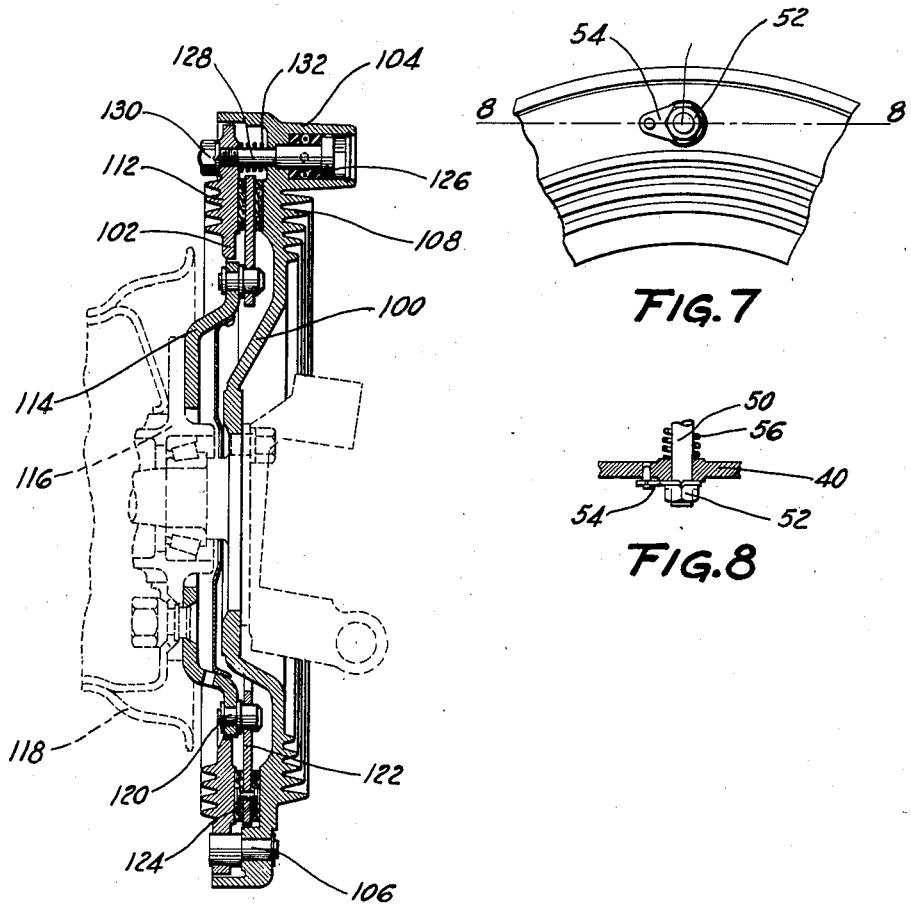
FIG.6
FIG.7
FIG.8
INVENTOR.
LUDGER E. LA BRIE
BY O. H. Fowler
ATTORNEY Patented Jan. 26, 1937

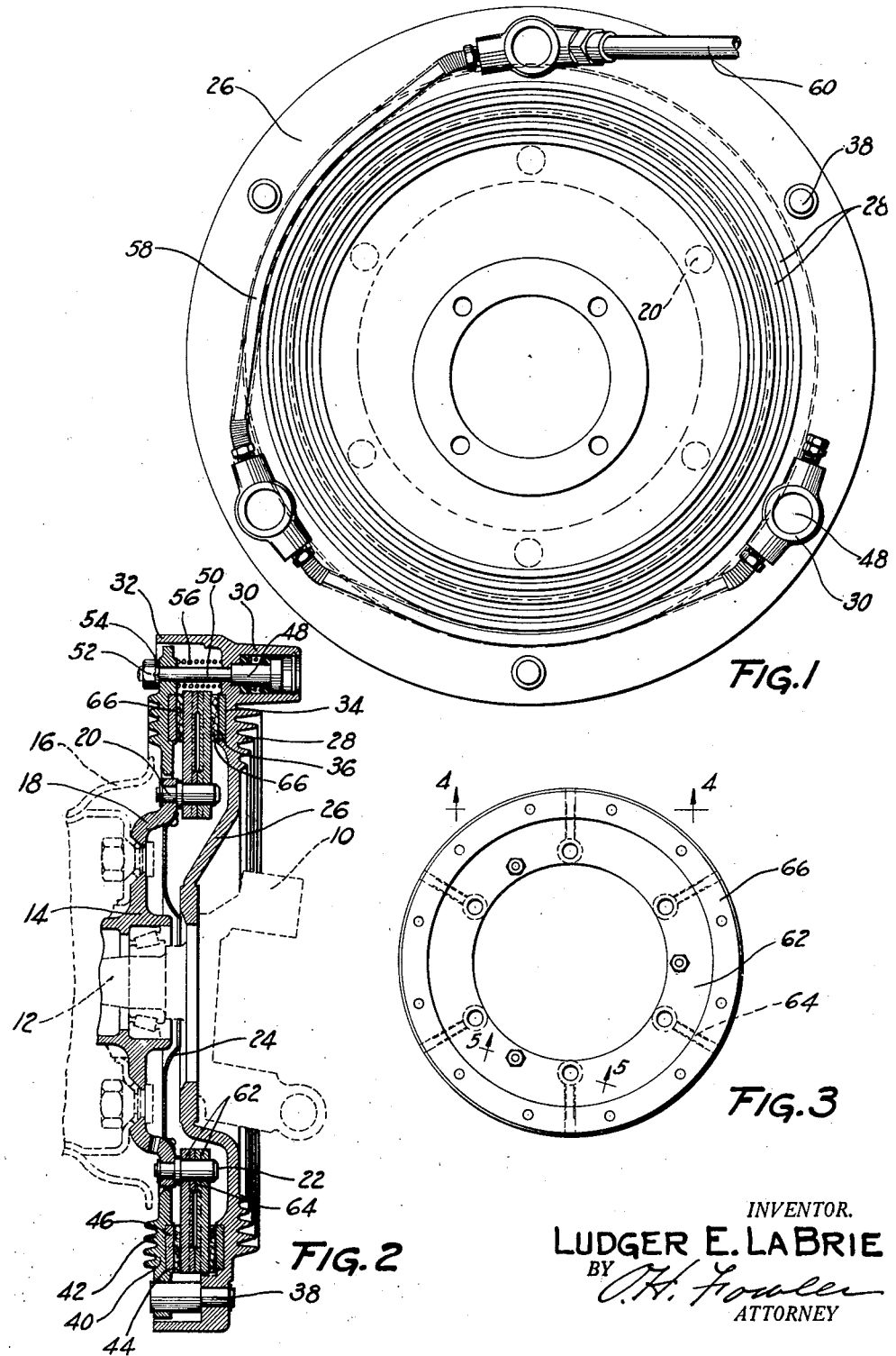

2,068,956

UNITED STATES PATENT OFFICE 2,068,956

BRAKE

Ludger E. La Brie, South Bend, Ind., assignor to Bendix Aviation Corporation, South Bend, Ind., a corporation of Delaware Application March 18, 1932, Serial No. 599,789

6 Claims. (Cl. 188—72)

This invention relates to brakes and more particularly to disc brakes.

Broadly, the invention comprehends a heavy duty brake of the disc type including a fixed and a movable disc preferably of cast iron having heat radiating fins. The fixed disc has cast integral therewith a plurality of cylinders arranged in spaced relation and protruding outwardly so that liquid admitted thereto will not be subjected to undue heat.

Positioned between the fixed and movable discs are rotatable discs supported on torque taking members protruding from the hub of a wheel. The faces of the rotatable discs are suitably spaced to provide for the circulation of air for cooling purposes and their oppositely disposed faces are provided with friction lining, adaptable for engagement with the fixed and movable discs, immediately opposite the heat radiating fins.

Positioned for movement in the cylinders are suitable pistons having rods extending through the walls of the fixed and movable discs, and provided on their free ends with nuts. Coil springs are positioned on the rods between the fixed and movable discs, and the cylinders are provided with closures and a suitable port for the admission of fluid under pressure.

An object of the invention is to provide a disc brake having a fixed and a movable disc, and interposed rotatable discs arranged to effectively dissipate heat generated in the brake.

Another object of the invention is to provide a brake structure including a fixed disc, a movable disc, and rotatable frictional elements positioned between the discs, and means for hydraulically actuating the movable disc including an air cooled cylinder.

Another object of the invention is to provide a brake structure including a fixed disc, a movable disc, friction elements cooperating therewith, and oppositely arranged means on the fixed and movable discs for dissipating heat.

A feature of the invention is the spaced rotatable friction elements.

Another feature of the invention is a fixed and a movable disc having heat radiating fins arranged in oppositely disposed relation and a plurality of rotatable friction elements positioned between the fixed and movable discs.

Another feature of the invention is a fixed and a movable disc having opposed channels for the reception of friction material, and a rotatable member positioned between the disc having friction linings secured thereto in oppositely disposed relation.

A further feature of the invention is a brake structure including a fixed and a movable disc, rotatable friction elements between the disc and means for moving the movable disc including pistons protruding from the fixed disc.

Other objects and features of the invention will appear from the following description taken in connection with the drawings, which form a part of the specification, and in which:

Figure 1 is a side elevation of a brake illustrating the operating means;

Figure 2 is a vertical sectional view of a brake embodying the invention;

Figure 3 is a side elevation of the friction disc;

Figure 4 is a sectional view substantially on line 4—4, Figure 3;

Figure 5 is a sectional view substantially on line 5—5, Figure 3;

Figure 6 is a vertical sectional view of a brake structure illustrating a modification of the invention;

Figure 7 is a fragmentary view illustrating the connection between one of the operating pistons and the movable disc; and Figure 8 is a section substantially on line 8—8 Figure 7.

Referring to the drawings for more specific details of the invention, 10 represents a steering knuckle supporting a spindle 12, on which is positioned for rotation a hub 14, having secured thereto a conventional wheel 16. The hub has formed thereon a flange 18, supporting a plurality of torque taking pins 20, having beveled end portions 22, the object of which will hereinafter appear.

Suitably secured to the flange 18, is a disc 24, embracing the spindle 12 and arranged to exclude grease from the brake structure, to be hereinafter described. Secured to the knuckle 10 is a disc 26, having heat radiating fins 28, and integral cylinders 30. These cylinders are arranged in spaced relation on the outside of the disc between the heat radiating fins 28 and a flange 32. The inner surface of the disc is provided with a groove or channel 34, in which is positioned a suitable friction liner 36, preferably cast iron.

Arranged on the disc 26, in alternating relation with the cylinders 30 are pins 38 on which is positioned a movable disc 40 having heat radiating fins 42 oppositely disposed with respect to the fins 28 on the disc 26, and a groove or channel 44 for the reception of a liner 46 corresponding to the liner in the disc 26 and opposed thereto. Positioned for reciprocation in the cylinders 30 are pistons 48. These pistons have rods 50 which extend through registering openings in the disc 26 and disc 40, and have threaded on their ends nuts 52 secured against displacement by a suitable lockwasher 54. The piston rods have wound thereon between the discs 26 and 40 compression springs 56 tending to force these elements apart. The cylinders are connected by tubes 58, and connected to one of the cylinders is a supply pipe or tube 60 leading to a suitable fluid pressure means. Fluid thus enters the upper cylinder (Fig. 1) through main supply pipe 60 and enters the other cylinders through connecting tubes 58.

Positioned for movement on the torque taking pins 20 are corresponding friction discs 62 spaced apart by lugs or bosses 64. Because of the beveled ends on the torque taking pins 20, the discs may be readily placed thereon even though they may not be perfectly alined. The spaced relation of the discs 62 causes air to circulate between these discs upon rotation thereof and to effectively cool the disc. These discs have secured thereto suitable friction liners 66, arranged immediately opposite the cast iron liners on the fixed disc 26 and the movable disc 40.

A modification of the invention is illustrated in Figure 6. In this modification there is provided a fixed disc 100 and a movable disc 102. The fixed disc has formed thereon a plurality of cylinders 104 arranged in spaced relation and a plurality of lugs or pins 106 alternating with the cylinders. The movable disc 102 is positioned on the pins 106. These pins serve to support the disc 102 and to prevent relative rotation between the disc 102 and the disc 100.

The fixed disc has heat radiating fins 108 and the movable disc has heat radiating fins 112. These heat radiating fins are arranged in oppositely disposed relation immediately opposite the braking surface of the disc.

Associated with the fixed and movable discs is a rotatable member 114 suitably supported on a hub 116 to which is secured a conventional wheel 118. The rotatable member 114 has positioned thereon a plurality of torque taking pins 120 on which is movably positioned a friction disc 122, having a friction lining 124 secured thereto, for engagement with the friction surfaces of the discs 100 and 102.

Positioned for reciprocation in the cylinders 104 are hydraulically operated pistons 126 having rods 128 extending through registered openings in the discs 100 and 102. The rods have threaded thereon nuts 130 suitably secured against displacement, and wound on the rods intermediate the discs 100 and 102 are springs 132.

In both embodiments of the invention, the fixed and movable discs are preferably cast of iron, gunite or aluminum alloys with cast iron liners for the braking surfaces. The structure is particularly adaptable for use on heavy passenger cars and on trucks. Because of the particular arrangement of the cylinders for actuating the brake, overheating of the liquid in the cylinders is avoided, since the cylinders are exposed to atmosphere. The structure requires but little space in the lateral direction, and therefore, it is not essential that it should be placed inside of the rim.

In the operation of both embodiments of the invention, liquid is supplied to all the cylinders through main supply pipe 60 or pipes corresponding thereto and connecting tubes 58 or their equivalent. This causes pistons 48 or 126 to be moved to the right (Figures 2 and 6) and thus draws the movable discs 40 and 102 toward the corresponding fixed discs 26 and 100. The fixed and movable discs thus clamp the rotating discs between them. The fixed discs are prevented from rotation on account of their connection to the steering knuckles such as 10 and the movable discs are also prevented from rotation on account of their connection with the fixed discs through the pins 38 and 106. Thus the rotation of the friction discs 62 and 122 is retarded and consequently rotation of the associated wheels is also retarded.

While preferred embodiments of the invention have been described, it is to be understood that these are given merely as examples of the underlying principles of the invention, and since these may be incorporated in other specific mechanical structures, we do not intend to be limited to those shown except as such limitations are clearly imposed by the appended claims.

Having thus described the various features of the invention what I claim as new and desire to secure by Letters Patent, is:

1. A brake structure comprising a disc having a flange, an annular slot in the disc, a liner positioned in the slot, friction means cooperating with said liner, and heat radiating flanges formed on the disc in oppositely disposed relation to the liner.

2. A brake comprising a disc having a flange and an annular slot, a liner in the slot, friction means cooperating with said liner, a plurality of cylinders formed on the disc and extending therefrom in an opposite direction from the flange, and graduated concentric heat radiating fins formed integral with the disc and arranged in oppositely disposed relation to the slot supporting the liner.

3. A brake comprising a fixed disc, a movable disc supported thereby, a friction element interposed between the fixed disc and the movable disc, cylinders formed integral with the fixed disc, pistons in the cylinders, rods connecting the pistons to the movable disc, and means for actuating the pistons.

4. A brake comprising a fixed disc, a movable disc, a rotatable friction element interposed between the fixed disc and the movable disc, cylinders formed integral with the fixed disc, pistons in the cylinders, rods connecting the pistons to the movable discs, and means for hydraulically operating the pistons.

5. A brake comprising a fixed disc having a flange, cylinders formed on the disc in spaced relation adjacent the flange, an axially movable disc supported on the fixed disc, pistons in the cylinders, means connecting the pistons to the movable discs, means for actuating the pistons, a rotatable member, a friction element axially movable on the rotatable member having a portion positioned between the fixed disc and the movable disc and heat radiating fins on the fixed and movable discs arranged in oppositely disposed relation.

6. A brake comprising a fixed disc having a flange, spaced cylinders formed integral with the disc adjacent the flange, heat radiating fins formed integral with the disc adjacent the cylinders, a movable disc supported on the fixed disc, pistons in the cylinders, means connecting the pistons to the movable disc, means for actuating the pistons, a rotatable member associated with the discs, and a friction element supported for axial movement on the rotatable member including spaced discs and liners on the spaced discs engaging the fixed and movable discs opposite the heat radiating fins.

LUDGER E. LA BRIE.